United States Patent
Porte et al.

(10) Patent No.: US 11,702,213 B2
(45) Date of Patent: Jul. 18, 2023

(54) AIRCRAFT ENGINE NACELLE PROVIDED WITH AN ICING PROTECTION SYSTEM AND ASSOCIATED PROTECTION METHOD

(71) Applicant: Airbus Operations SAS, Toulouse (FR)

(72) Inventors: Alain Porte, Colomiers (FR); François Pons, Daux (FR); Jonathan Carcone, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 887 days.

(21) Appl. No.: 16/377,813

(22) Filed: Apr. 8, 2019

(65) Prior Publication Data
US 2019/0308737 A1    Oct. 10, 2019

(30) Foreign Application Priority Data
Apr. 10, 2018 (FR) ...................... 1853110

(51) Int. Cl.
*B64D 15/22* (2006.01)
*B64D 15/12* (2006.01)
(Continued)

(52) U.S. Cl.
CPC ............. *B64D 15/22* (2013.01); *B64D 15/12* (2013.01); *B64D 15/20* (2013.01); *B64D 29/00* (2013.01);
(Continued)

(58) Field of Classification Search
CPC ........ B64D 15/22; B64D 15/12; B64D 15/20; B64D 29/00; B64D 33/02;
(Continued)

(56) References Cited

U.S. PATENT DOCUMENTS

| 7,513,458 B2 * | 4/2009 | Layland ................. | B64D 15/12 244/134 R |
| 7,588,212 B2 * | 9/2009 | Moe ....................... | B64D 15/12 244/134 D |

(Continued)

FOREIGN PATENT DOCUMENTS

| EP | 1715159 A1 * | 10/2006 | ............. B64D 15/12 |
| EP | 1873060 A1 * | 1/2008 | ............. B64D 15/12 |

(Continued)

OTHER PUBLICATIONS

French Search Report; priority document.

*Primary Examiner* — Donald J Wallace
*Assistant Examiner* — Jalal C Coduroglu
(74) *Attorney, Agent, or Firm* — Greer, Burns & Crain, Ltd.

(57) ABSTRACT

An aircraft engine nacelle comprising an icing protection system and an icing protection method for such an aircraft engine nacelle. The aircraft engine nacelle comprises an air inlet comprising a lip, a tubular air inlet piece and an icing protection system. The icing protection system comprises an icing prevention means powered continuously by a first electrical energy source and wholly or partly covering the lip, a de-icing means powered by a second electrical energy source covering the tubular air inlet piece and a controller configured to acquire a current total air temperature value, and control the second electrical energy source as a function of the current total air temperature value.

12 Claims, 1 Drawing Sheet

(51) Int. Cl.
  *B64D 29/00* (2006.01)
  *H05B 1/02* (2006.01)
  *H05B 3/00* (2006.01)
  *B64D 15/20* (2006.01)
  *F02C 7/047* (2006.01)
  *B64D 33/02* (2006.01)

(52) U.S. Cl.
  CPC .............. *B64D 33/02* (2013.01); *F02C 7/047* (2013.01); *H05B 1/0236* (2013.01); *H05B 3/0019* (2013.01); *B64D 2033/0233* (2013.01)

(58) Field of Classification Search
  CPC ............ B64D 2033/0233; F02C 7/047; H05B 1/0236; H05B 3/0019; F05D 2270/313; F05D 2270/708
  See application file for complete search history.

(56) References Cited

U.S. PATENT DOCUMENTS

| | | | | |
|---|---|---|---|---|
| 9,206,710 | B2* | 12/2015 | Gurin | F01K 15/02 |
| 9,469,408 | B1* | 10/2016 | Elangovan | B64D 33/02 |
| 9,540,119 | B1* | 1/2017 | Heinrich | H04W 4/029 |
| 2009/0306927 | A1* | 12/2009 | Brivet | G01K 13/028 |
| | | | | 702/141 |
| 2010/0199629 | A1* | 8/2010 | Chene | F02C 7/045 |
| | | | | 60/39.093 |
| 2011/0024409 | A1* | 2/2011 | Shah | C04B 20/1055 |
| | | | | 428/323 |
| 2011/0106475 | A1* | 5/2011 | Wigen | G01K 13/02 |
| | | | | 702/99 |
| 2011/0155855 | A1* | 6/2011 | Caruel | H05B 3/267 |
| | | | | 430/324 |
| 2011/0225975 | A1* | 9/2011 | Pereira | B64D 15/22 |
| | | | | 60/39.093 |
| 2014/0205446 | A1* | 7/2014 | Patsouris | F02C 7/047 |
| | | | | 415/175 |
| 2016/0052621 | A1* | 2/2016 | Ireland | F04D 29/681 |
| | | | | 137/13 |
| 2016/0053690 | A1* | 2/2016 | Perkinson | F02C 7/275 |
| | | | | 60/788 |
| 2016/0159488 | A1* | 6/2016 | Roach | B29D 22/00 |
| | | | | 427/443.1 |
| 2016/0236790 | A1* | 8/2016 | Knapp | G01C 21/20 |
| 2017/0057618 | A1* | 3/2017 | Khozikov | B64C 7/02 |
| 2017/0057644 | A1* | 3/2017 | Khozikov | B64D 15/12 |
| 2017/0106993 | A1* | 4/2017 | Anderson | B64D 43/02 |
| 2017/0194545 | A1* | 7/2017 | de Rochemont | H10N 10/853 |
| 2017/0268423 | A1* | 9/2017 | Schwarz | F02C 6/08 |
| 2018/0057176 | A1* | 3/2018 | Kinlen | H01B 1/122 |
| 2020/0391871 | A1* | 12/2020 | Essawy | G01P 21/025 |

FOREIGN PATENT DOCUMENTS

| | | | | |
|---|---|---|---|---|
| EP | 1893484 | A2 | 3/2008 | |
| EP | 1893484 | A2 * | 3/2008 | ............. B64D 15/12 |
| EP | 2317293 | A2 * | 5/2011 | ............. G01K 13/02 |
| EP | 2317293 | A2 | 5/2011 | |
| EP | 2292514 | B1 * | 11/2014 | ............. B64D 15/12 |
| WO | WO-2006136748 | A2 * | 12/2006 | ............. B64D 15/12 |
| WO | 2010055215 | A1 | 5/2010 | |
| WO | WO-2010055215 | A1 * | 5/2010 | ............. B64D 15/12 |
| WO | WO-2013124397 | A1 * | 8/2013 | ........... B29C 70/021 |

\* cited by examiner

AIRCRAFT ENGINE NACELLE PROVIDED WITH AN ICING PROTECTION SYSTEM AND ASSOCIATED PROTECTION METHOD

CROSS-REFERENCES TO RELATED APPLICATIONS

This application claims the benefit of the French patent application No. 1853110 filed on Apr. 10, 2018, the entire disclosures of which are incorporated herein by way of reference.

FIELD OF THE INVENTION

The invention relates to an aircraft engine nacelle comprising an icing protection system and an icing protection method for such an aircraft engine nacelle.

BACKGROUND OF THE INVENTION

An aircraft propulsion assembly comprises an engine encircled by a nacelle and which has, at the front, an air inlet which channels the air to direct it towards the engine. The air inlet comprises a lip and a tubular part which are exposed to the cold air and on which ice is likely to form from the water present in the atmosphere. The quantity of ice which is deposited on the wall of the lip of the aircraft is variable and depends on the climatic conditions in which the aircraft is flying.

To limit and/or delimit this formation of ice, aircraft engine nacelles are known, for example from the document EP 1 893 484, in which the air inlet is wholly or partly covered by a de-icing system segmented into several de-icing sectors. A first de-icing sector, situated in the tubular part of the air inlet, is powered continuously to prevent the formation of ice and a second de-icing sector, situated in the lip of the air inlet, is powered according to a periodic heating cycle, initially allowing the formation of ice, then, in a second stage, allowing the separation thereof. The duly separated ice is sucked through the air inlet towards the engine. The de-icing of the tubular part is not optimized because it is implemented independently of the quantity of ice present. Thus, it may be that the quantity of ice present is negligible or, on the contrary, that the quantity of ice is too great. In the first case, there is a non-optimized use of the electrical resources of the aircraft. In the second case, it is desirable to improve the nacelle de-icing performance levels.

SUMMARY OF THE INVENTION

An aim of the present invention is, in particular, to provide a solution to these problems. It relates to an aircraft engine nacelle comprising an air inlet comprising a lip, a tubular air inlet piece and an icing protection system, the icing protection system comprising an icing prevention means powered continuously by a first electrical energy source and wholly or partly covering the lip and a de-icing means powered by a second electrical energy source covering the tubular air inlet piece.

The nacelle is noteworthy in that the de-icing means further comprises a controller configured to:
acquire a current total air temperature value, and
control the second electrical energy source as a function of the current total air temperature value.

Thus, the ice is formed preferentially in the tubular air inlet piece, which is de-iced by virtue of the de-icing means which is powered as a function of the total air temperature. That makes it possible to optimize the electrical resources of the aircraft and to control the quantity of ice present on the wall of the tubular air inlet piece.

Advantageously, the controller is configured to iteratively control the second electrical energy source according to a pause time during which the de-icing means is not powered with electrical energy and an activation time during which the de-icing means is powered with electrical energy.

The controller comprises a processing unit and a data memory in which a reference table is stored, comprising one or more records arranged to each memorize a total air temperature, an activation time and a pause time of the second electrical energy source, and is configured to:
search for a record of the reference table for which the total air temperature value corresponds to the current total air temperature value;
read, in the record of the reference table associated with the current total air temperature value, the respective values of the pause time and of the activation time;
control the second electrical energy source with:
a pause time of a duration equal to the value of the pause time read, then
an activation time of a duration equal to the value of the activation time read.

In one embodiment, the reference table comprises a de-icing power, and the controller is configured to read, in the record of the reference table associated with the current total air temperature value, the value of the de-icing power, and to control the second electrical energy source to power the de-icing means as a function of the value of the de-icing power read.

Advantageously, the controller is configured to control the activation of the first electrical energy source, prior to the activation of the second electrical energy source as a function of the current total air temperature value.

Advantageously, the icing prevention means and the de-icing means comprise arrays of resistive heating elements powered respectively by the first and second electrical energy sources.

The invention also relates to an icing protection method for an aircraft engine nacelle comprising an air inlet comprising a lip, tubular air inlet piece and an icing protection system, the icing protection system comprising icing prevention means powered continuously by a first electrical energy source and wholly or partly covering the lip and a de-icing means, powered by a second electrical energy source, covering the tubular air inlet piece. The method is noteworthy in that it comprises the following steps implemented by a controller of the icing protection system:
acquisition of a current total air temperature value;
controlling of the second electrical energy source as a function of the current total air temperature value.

Advantageously, the controller being configured to iteratively control the second electrical energy source according to a pause time during which the de-icing means is not powered with electrical energy and an activation time during which the de-icing means is powered with electrical energy, the controller comprising a processing unit and a data memory in which a reference table is stored, comprising one or more records arranged to each memorize a total air temperature, an activation time and a pause time of the second electrical energy source, the step of controlling of the second electrical energy source as a function of the current total air temperature value comprises the following substeps:

searching for a record of the reference table for which the total air temperature value corresponds to the current total air temperature value;

reading, in the record of the reference table associated with the current total air temperature value, respective values of the pause time and of the activation time;

controlling the second electrical energy source with:

a pause time of a duration equal to the value of the pause time read, then an activation time of a duration equal to the value of the activation time read.

In one embodiment, each record of the reference table comprising the value of a de-icing power, the step of controlling of the second electrical energy source as a function of the current total air temperature value further comprises the following substeps:

reading, in the record of the reference table associated with the current total air temperature value, the value of the de-icing power, and controlling the second electrical energy source to power the de-icing means as a function of the value of the de-icing power read.

Advantageously, the icing protection method for an aircraft engine nacelle comprises a step of activation of the first electrical energy source, prior to the step of activation of the second electrical energy source, as a function of the current total air temperature value.

BRIEF DESCRIPTION OF THE DRAWINGS

Other features, details and advantages of the invention will emerge more clearly from the detailed description given hereinbelow by way of indication in relation to the drawings in which.

DETAILED DESCRIPTION OF THE PREFERRED EMBODIMENTS

Figure 1:
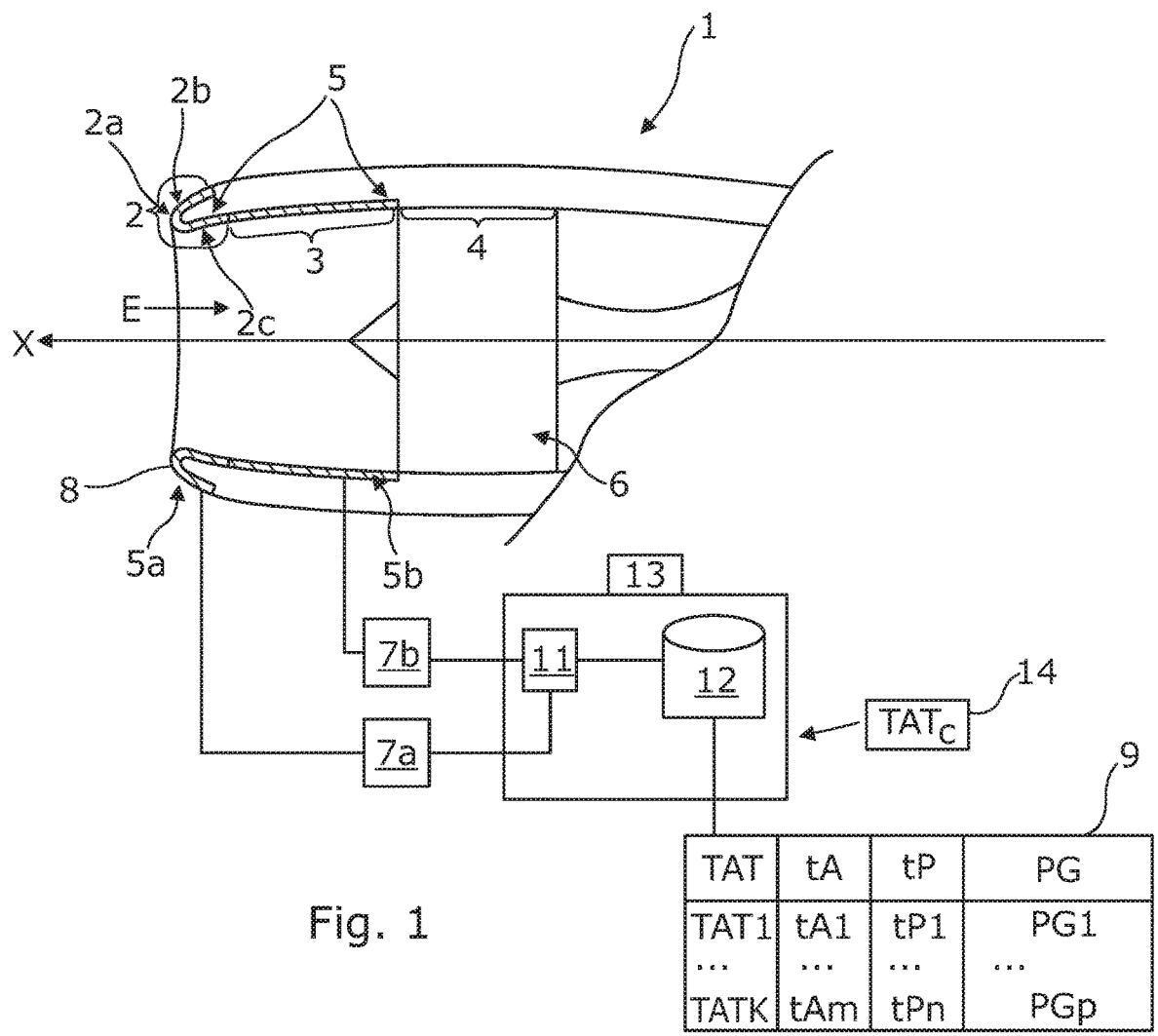
FIG. 1 is a partial side and cross-sectional view of an engine nacelle comprising an icing protection system according to an embodiment of the invention.

A partial side and cross-sectional view of an aircraft engine nacelle 1 is represented schematically in FIG. 1. In the following description, and by convention, X denotes the longitudinal axis of an aircraft engine oriented positively in the direction of advance of the aircraft.

An aircraft engine nacelle 1 takes an annular form about the longitudinal axis X. Such a nacelle 1 encircles an air inlet E followed along the longitudinal axis X of an engine 6, such as a turbojet engine. The nacelle 1 comprises a lip 2, followed along the longitudinal axis X of a tubular air inlet piece 3 and of a tubular engine piece 4.

The lip 2 comprises a U-shaped wall, the aperture of which is oriented towards the rear of the aircraft and whose bottom forms a leading edge 2a of the lip 2. The lip 2 extends on either side of the leading edge 2a, along an outer face 2b oriented outwards and in contact with the outside air and an inner face 2c oriented towards the air inlet E.

The tubular engine piece 4 comprises a wall which encircles the aircraft engine 6.

The tubular air inlet piece 3 comprises a wall which extends between the lip 2 and the tubular engine piece 4, in the extension of the inner face 2c of the lip 2.

The aircraft nacelle 1 further comprises an icing protection system 5 comprising an icing prevention means 5a and a de-icing means 5b. The icing prevention means 5a and the de-icing means have an annular form. The icing prevention means 5a wholly or partly covers the wall of the lip 2, that is to say, that it extends along the inner face 2c to the leading edge 2a or along the inner face 2c and the outer face 2b. The de-icing means 5b wholly or partly covers the wall of the tubular air inlet piece 3.

The icing prevention means 5a and the de-icing means 5b comprise arrays of resistive heating elements, commonly called thermal jackets, and powered respectively by a first electrical energy source 7a and a second electrical energy source 7b.

The icing protection system 5 further comprises a controller 13 comprising a processing unit 11 and a data memory 12. The latter is configured to store a reference table 9 comprising one or more records arranged to each memorize a total air temperature TAT1, ..., TATk, an activation time tA1, ... tAm of the second electrical energy source 7b and a pause time tP1, ..., tPn of the second electrical energy source.

The values of the activation times tA1, ..., tAm and of the pause times tP1, ..., tPn of each record are predefined as a function of the associated total air temperature TAT1, ..., TATk. For example, for a total air temperature TAT1 equal to −18° C., reflecting a high quantity of water in the atmosphere, the activation time tA1 can be equal to 4 seconds and the pause time tP1 can be equal to 20 seconds. During the pause time tP1, it is estimated that a thickness of ice of 0.6 mm is created on the tubular air inlet piece 3. For a total air temperature TAT2 equal to 0° C., reflecting a low quantity of water in the atmosphere, the activation time tA2 can be equal to 1 second and the pause time tP2 can be equal to 80 seconds. During the pause time tP2, it is estimated that a thickness of ice of 0.1 mm is created on the tubular air inlet piece 3.

According to a variant, each record of the reference table 9 comprises the value of a de-icing power PG1, ..., PGp.

As an example, for a total air temperature TAT1 equal to −18° C., the de-icing power can be equal to 15 kW/m2, and for a total air temperature TAT2 equal to 0° C., the de-icing power can be equal to 3 kW/m2. This feature makes it possible to further optimize the energy resources of the aircraft.

The icing protection system 5 is linked at the inlet to a source of information 14 capable of supplying the current total air temperature TATc. The value of the current total air temperature TATc is measured by probes present on the fuselage of the aircraft or is estimated from a set of flight data, according to methods well known to the person skilled in the art.

Figure 2:
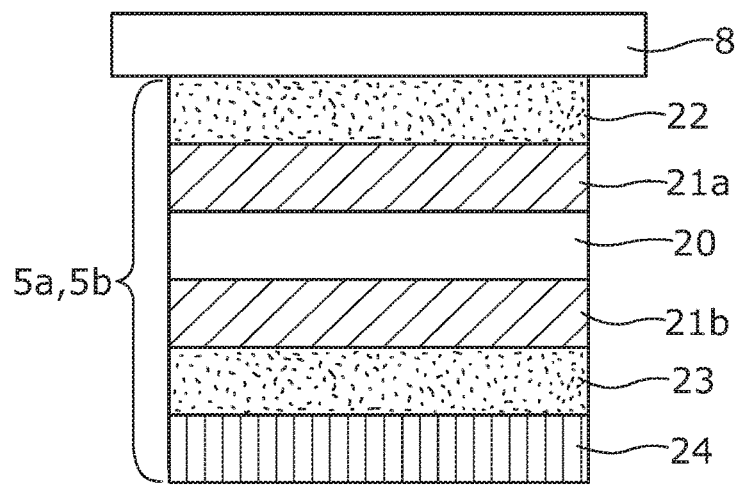
FIG. 2 is a cross-sectional view of a thermal jacket.

FIG. 2 presents a cross-sectional view of a thermal jacket 5a, 5b. Such a thermal jacket 5a, 5b comprises a core 20 comprising resistive heating elements powered by the first or the second electrical energy source 7a, 7b. Such resistive elements can be, for example, carbon nanotubes or an alloy of aluminum embedded in a thermoplastic resin or a thermosetting resin. On either side of the core 20, there are affixed first and a second layers of glass fiber 21a and 21b. To limit the heat losses, the thermal jacket 5a, 5b is covered with a thermal insulation 24 secured to the glass fiber 21b by a first adhesive 23. The thermal jacket 5a, 5b is secured to the part to be heated up, here all or part of the wall 8 of the air inlet E of the nacelle 1, by a second adhesive 22. The thermal jacket 5a, 5b is not limited to this configuration. Indeed, the adhesives 22, 23 can be replaced by anchoring members known to the person skilled in the art.

According to a variant not represented in the figures, all or part of the icing protection system 5 can be secured to an acoustic panel fixed over all or part of the air inlet of the nacelle 1 and configured to attenuate the noises of the engine 6. The icing protection system 5 consequently comprises through orifices to allow the acoustic panel to work.

In operation, the icing prevention means 5a is powered continuously by the first electrical energy source 7a, so as to maintain the temperature of the lip 2 at a temperature greater than or equal to 0° C. This feature prevents the buildup of ice on the lip 2 and makes it possible to guide and/or cause the deposited water to run off towards the tubular air inlet piece 3 where it solidifies by forming ice. For that, the controller 13 is configured to control a step of activation of the first electrical energy source 7a for the implementation of the icing prevention means 5a.

Advantageously, the controller 13 controls the power supply of the icing prevention means 5a as a function of the meteorological conditions in which the aircraft is flying, in order to guarantee a lip temperature greater than or equal to 0° C.

The controller 13 is configured to activate the second electrical energy source 7b as a function of the current total air temperature value TATc, so as to limit the thickness of ice present on the wall of the tubular air inlet piece to three millimeters.

For that, the controller 13 is configured to:
acquire a current total air temperature value TATc, from the source of information 14, and
control the second electrical energy source 7b as a function of the current total air temperature value TATc.

The controller 13 is configured to implement the following substeps:
searching for a record of the reference table 9 for which the total air temperature value TAT corresponds to the current total air temperature value TATc;
reading, in the record of the reference table 9 associated with the current total air temperature value TATc, the respective values of the pause time tP and of the activation time tA;
controlling the second electrical energy source (7b) with:
a pause time of a duration equal to the value of the pause time tP read, then
an activation time of a duration equal to the value of the activation tA read.

In a particular exemplary embodiment of the invention, a total air temperature value TAT read in the reference table 9 is considered to correspond to the current total air temperature value TATc when the difference between, on the one hand, this total air temperature value TAT read in the reference table and, on the other hand, the current total air temperature value TATc, is below a predetermined temperature threshold. This predetermined temperature threshold is, for example, chosen to be equal to 0.5 degrees when the consecutive total air temperature values stored in the reference table 9 are spaced apart by 1 degree.

According to an embodiment of the invention, the controller 13 is configured to read, in the record of the reference table 9 associated with the current total air temperature value TATc, the value of the de-icing power PG1, . . . PGp and control the second electrical energy source 7b to power the de-icing means 5b as a function of the value of the de-icing power PG1, . . . PGp read.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine nacelle comprising:
an air inlet comprising:
a lip,
a tubular air inlet piece, and
an icing protection system, said icing protection system comprising:
an icing prevention means powered continuously by a first electrical energy source and wholly or partly covering the lip and a de-icing means comprising an array of resistive heating elements, the array of resistive heating elements powered by a second electrical energy source, the de-icing means covering the tubular air inlet piece,
wherein the de-icing means further comprises a controller:
wherein the controller acquires a current total air temperature value, and
the controller controls the second electrical energy source as a function of the current total air temperature value.

2. The nacelle according to claim 1, wherein the controller is configured to iteratively control the second electrical energy source according to a pause time during which the de-icing means is not powered with electrical energy and an activation time during which the de-icing means is powered with electrical energy, the controller comprising a processing unit and a data memory in which a reference table is stored, comprising one or more records arranged to each memorize a total air temperature, an activation time and a pause time of the second electrical energy source, and wherein the controller is configured to:
search for a record of the reference table for which the total air temperature value corresponds to the current total air temperature value;
read, in the record of the reference table associated with the current total air temperature value, the respective values of the pause time and of the activation time;
control the second electrical energy source with:
a pause time of a duration equal to the value of the pause time read, then
an activation time of a duration equal to the value of the activation time read.

3. The nacelle according to claim 2, wherein each record of the reference table comprises a de-icing power, and wherein the controller is configured to read, in the record of the reference table associated with the current total air temperature value, the value of the de-icing power, and to control the second electrical energy source to power the de-icing means as a function of the value of the de-icing power read.

4. The nacelle according to claim 1, wherein the controller is configured to control an activation of the first electrical energy source, prior to an activation of the second electrical energy source, as a function of the current total air temperature value.

5. The nacelle according to claim 1, wherein the icing prevention means comprises an array of resistive heating elements powered by the first electrical energy source.

6. The nacelle according to claim 1, wherein the lip comprises a U-shaped wall, an aperture of which is oriented towards a rear of the aircraft, a bottom of the U-shaped lip forms a leading edge of the lip and wall portions of the U-shaped extend on opposite sides of the leading edge along an outer face oriented outwards and in contact with outside air and an inner face oriented radially inwardly, and wherein the tubular air inlet piece comprises a wall as an extension of the inner face of the lip which extends between the lip and a tubular engine piece located aft of the air inlet.

7. An icing protection method for an aircraft engine nacelle comprising:
an air inlet comprising a lip, a tubular air inlet piece and an icing protection system, said icing protection system comprising icing prevention means powered continuously by a first electrical energy source and wholly or partly covering the lip and a de-icing means, powered by a second electrical energy source, covering the tubular air inlet piece,
said method comprising the following steps implemented by a controller of the icing protection system:
acquiring a current total air temperature value; and
controlling the second electrical energy source as a function of the current total air temperature value.

8. The icing protection method for an aircraft engine nacelle according to claim 7, wherein the controller is configured to iteratively control the second electrical energy source according to a pause time during which the de-icing means is not powered with electrical energy and an activation time during which the de-icing means is powered with electrical energy, the controller comprising a processing unit and a data memory in which a reference table is stored, comprising one or more records arranged to each memorize a total air temperature, an activation time and a pause time of the second electrical energy source,
the step of controlling of the second electrical energy source as a function of the current total air temperature value comprises the following substeps:
searching for a record of the reference table for which the total air temperature value corresponds to the current total air temperature value;
reading, in the record of the reference table associated with the current total air temperature value, the respective values of the pause time and of the activation time;
controlling the second electrical energy source with:
a pause time of a duration equal to the value of the pause time read, then
an activation time of a duration equal to the value of the activation time read.

9. The icing protection method for an aircraft engine nacelle according to claim 8, wherein, each record of the reference table comprises the value of a de-icing power, the step of controlling of the second electrical energy source as a function of the current total air temperature value further comprises the following substeps:
reading, in the record of the reference table associated with the current total air temperature value, the value of the de-icing power, and
controlling the second electrical energy source to power the de-icing means as a function of the value of the de-icing power read.

10. The icing protection method for an aircraft engine nacelle according to claim 7, further comprising a step of activation of the first electrical energy source, prior to the step of activation of the second electrical energy source, as a function of the current total air temperature value.

11. The icing protection method for an aircraft engine nacelle according to claim 7, wherein the lip comprises a U-shaped wall, an aperture of which is oriented towards a rear of the aircraft, a bottom of the U-shaped lip forms a leading edge of the lip and wall portions of the U-shaped extend on opposite sides of the leading edge along an outer face oriented outwards and in contact with outside air and an inner face oriented radially inwardly, and wherein the tubular air inlet piece comprises a wall as an extension of the inner face of the lip which extends between the lip and a tubular engine piece located aft of the air inlet.

12. An aircraft engine nacelle comprising:
an air inlet comprising:
a lip,
a tubular air inlet piece, and
an icing protection system, said icing protection system comprising:
an icing prevention means powered continuously by a first electrical energy source and wholly or partly covering the lip and a de-icing means, powered by a second electrical energy source, covering the tubular air inlet piece,
wherein the de-icing means further comprises a controller configured to:
acquire a current total air temperature value, and
control the second electrical energy source as a function of the current total air temperature value, and
wherein the de-icing means further comprises a thermal jacket comprising:
a core comprising resistive heating elements powered by the second electrical energy source;
a first layer of glass fiber on one side of the core,
a second layer of glass fiber on a second side of the core, and
a thermal insulation secured to the second layer of glass fiber by a first adhesive,
wherein the thermal jacket is secured to the part to the tubular air inlet piece by a second adhesive.

\* \* \* \* \*